United States Patent
Kasperson et al.

(10) Patent No.: US 10,887,206 B2
(45) Date of Patent: Jan. 5, 2021

(54) INTERCONNECT PORT LINK STATE MONITORING UTILIZING UNSTABLE LINK STATE ANALYSIS

(71) Applicant: HEWLETT PACKARD ENTERPRISE DEVELOPMENT LP, Houston, TX (US)

(72) Inventors: David Kasperson, Austin, TX (US); Alexander Kramer, Plano, TX (US); Robert Roy Teisberg, Austin, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/409,730

(22) Filed: May 10, 2019

(65) Prior Publication Data

US 2020/0358680 A1     Nov. 12, 2020

(51) Int. Cl.
| | | |
|---|---|---|
| *H04L 12/26* | | (2006.01) |
| *H04L 12/24* | | (2006.01) |
| *H04L 12/931* | | (2013.01) |

(52) U.S. Cl.
CPC .......... *H04L 43/0811* (2013.01); *H04L 41/22* (2013.01); *H04L 43/16* (2013.01); *H04L 49/357* (2013.01)

(58) Field of Classification Search
CPC ..... H04L 43/0811; H04L 41/22; H04L 43/16; H04L 49/357
USPC .................................................. 370/241, 250
See application file for complete search history.

(56) References Cited

U.S. PATENT DOCUMENTS

| | | | |
|---|---|---|---|
| 7,417,953 B2 | 8/2008 | Hicks et al. | |
| 2007/0041328 A1 | 2/2007 | Bell | |
| 2012/0077443 A1 | 3/2012 | Ishihara et al. | |
| 2014/0337506 A1* | 11/2014 | Sweeney | H04L 43/0823 709/224 |
| 2016/0359982 A1 | 12/2016 | Shih et al. | |
| 2019/0319869 A1* | 10/2019 | Ammireddy | H04L 45/54 |

OTHER PUBLICATIONS

Configure Link Flap Prevention on an Sx350 Series Managed Switch, (Web Page), Retrieved Dec. 17, 2018, 6 Pgs.
Detection and Handling of State Flapping, (Web Page), Retrieved Dec. 17, 2018, 3 Pgs.
Irfan, Y., What is the Link-flap error in Cisco Switches? (Web Page), Aug. 17, 2008, 3 Pgs.

* cited by examiner

*Primary Examiner* — Obaidul Huq
(74) *Attorney, Agent, or Firm* — Sheppard Mullin Richter & Hampton LLP

(57) ABSTRACT

Some implementations of the disclosure are directed to an interconnect including: a plurality of ports; a processor; and a non-transitory computer readable medium have instructions stored thereon, that when executed by a processor, cause the interconnect device to: track a link state of a first port of the plurality of ports, where tracking the link state of the first port comprises tracking when a physical link of the first port transitions between a linked state and an unlinked state; determine, using at least the tracking of when the physical link of the first port transitions between the linked state and the unlinked state, that the first port is in an unstable link state; and when the first port is in an unstable link state, transmitting a message to an interconnect management device, the message including an indication that the first port is in an unstable link state.

19 Claims, 6 Drawing Sheets

INTERCONNECT PORT LINK STATE MONITORING UTILIZING UNSTABLE LINK STATE ANALYSIS

DESCRIPTION OF RELATED ART

Link flapping may refer to the problem of an unstable physical interconnect port that continually connects and disconnects. One method of addressing this problem involves disabling the interconnect port that experiences link flapping.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate the reader's understanding of various embodiments and shall not be considered limiting of the breadth, scope, or applicability of the present disclosure. It should be noted that for clarity and ease of illustration these drawings are not necessarily made to scale.

The figures are not intended to be exhaustive or to limit various embodiments to the precise form disclosed. It should be understood that various embodiments can be practiced with modification and alteration.

DETAILED DESCRIPTION

As used herein, the terms "state machine" or "finite state machine" refer to a model of a system comprising a limited number of modes.

As used herein, the term "interconnect" refers to a data networking device comprising one or more physical ports that connect devices on a network. For example, an interconnect may be implemented as a physical resource that enables communication between hardware in an enclosure and data center Ethernet local area networks (LANs) and/or Fibre Channel (FC) storage area networks (SANS). In such implementations, the interconnect may include physical ports that connect to a data center network, physical ports that connect to server hardware (e.g., through an enclosure midplane), physical ports that join interconnects to provide redundant paths for network traffic, and/or other types of physical ports.

As another example, an interconnect may be implemented as a switch that uses packet switching to receive, process, and/or forward data to a destination device. In some implementations, an interconnect may be a modular device that may expanded (e.g., by adding additional modules for ports, power supplies, cooling fans, etc.) In some implementations, an interconnect may be implemented as a storage area network (SAN) switch that connects servers and shared pools of storage devices.

As used herein, the phrase "transmitting a message" or variations thereof may refer not only to using a communication protocol to make data available from one device to another device, but also other means of making the data available such as writing data to a hardware register or modifying a value in a shared memory. For example, transmitting a message to an interconnect management device including an indication that an interconnect port is in an unstable link state may refer to making a value corresponding to the unstable link state available in a data store, and the management device polling for the stored value. As another example, transmitting a message to an management device including an indication that an interconnect port is in an unstable link state may refer to using a communication protocol to asynchronously transmit the message from the interconnect to the management device.

Figure 1:
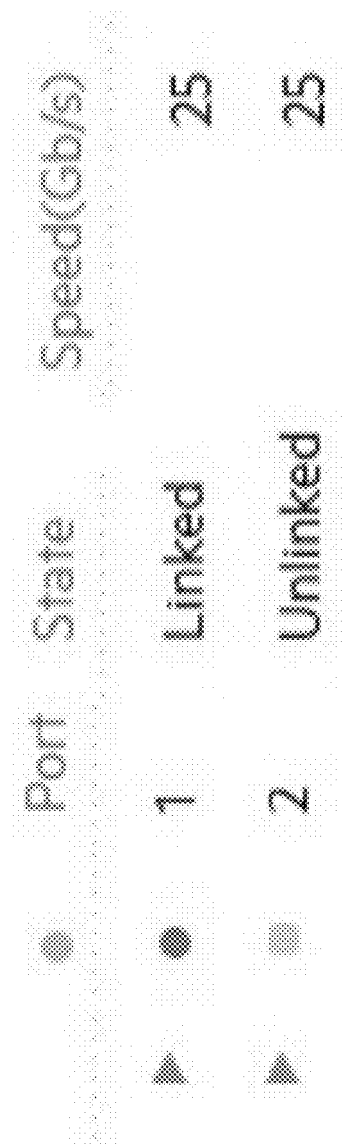
FIG. 1 shows a conventional port link state status user interface (UI) that may be provided by a device that collects port link state data from an interconnect in accordance with conventional methods.

In some present implementations of an interconnect, when a physical port of an interconnect changes from a linked state to an unlinked state (e.g., referred to as "logged-in" to "not logged-in" in the case of a Fibre Channel port), a port status change notification may be sent to a management station. FIG. 1 shows a conventional port link state status user interface (UI) that may be provided by a device that collects port link state data from an interconnect in accordance with present implementations. In this example, the link state "linked" for physical port 1 may refer to the fact that the last known port status of port 1 is that it is connected (e.g., to a server), whereas the link state "unlinked" for port 2 may refer to the fact that the last known port status of physical port 2 is that it is unconnected.

Interconnect port status changes may be sent to a management station through asynchronous notification or retrieved by the management station through a polling mechanism. During link flapping, interconnect ports may sometimes change link states back and forth very rapidly. Examples scenarios in which this may occur may include unstable power on a connected interconnect, faulty hardware, a faulty cable, or situations in which servers are in a continuous boot loop due to preboot execution environment (PXE) configured without a boot target. In such scenarios, if asynchronous mechanisms are processed quickly or polling loops retrieving the state are short, the processing of these changes may overwhelm the management station. Higher level tiered management stations may also be overwhelmed with processing the changes. Another problem is that UI usability may be decreased due to constantly changing port states.

In some systems, these problems caused by link flapping may be addressed by introducing mechanisms to throttle the port status changes. For example, the frequency of asynchronous notifications or polling of port link state status may be reduced. However, these mechanisms may introduce problems of their own. For example, throttling the port status changes may result in a loss of the data that is used by the management station to determine that a port has changed states. Also, additional processing may be needed to reenable port status change identification. Further, if asynchronous notifications or polling is done less frequently, a network administrator or other user managing or observing the interconnect may be less aware that the port is changing state, as a port may not be in a new state when state information is retrieved on a polling or asynchronous notification loop. For example, the issue that a port is rapidly changing state may not be recognized through a UI and/or a second tier management station that has reduced state change updates as compared to a first tier management station.

In some systems, the problems caused by link flapping may be addressed by disabling the port experiencing link flapping, and providing an indication that the port was disabled. In such instances, however, the system loses the ability to continue to monitor the port. Although the system may be configured to re-enable the port after a predetermined period of time, such behavior may not be ideal. If the port is still link flapping after being reenabled, the same problems due to link flapping may return. If the port is no longer link flapping, it may have been disabled for longer than necessary.

Implementations of the disclosure are directed to addressing the aforementioned problems through an improved port link state monitoring mechanism that detects whether a port is in an unstable state. In particular, some implementations are directed to configuring an interconnect to track an additional unstable state for each interconnect port that indicate that the port's state is changing back and forth between connected and unconnected states (e.g., "linked" state and "unlinked" state). During operation, the interconnect may send messages to a management station indicating when a port enters or leaves the unstable state, but not when the port transitions between being physically linked and unlinked when the port is already in the unstable state. Alternatively, when the management station polls for the link state, it may receive an indication that the link state is stable or unstable.

By virtue of such implementations, management stations, including second tier management stations, retrieving the port state may be able to detect if the port is in the new state without being overwhelmed by updates when the port transitions between being physically linked and unlinked in the unstable state. Additionally, management stations and UI users will not be overwhelmed processing link changes while in the unstable state. For example, it may be apparent to users of the UI when a port is an unstable state. The disclosed implementations may be particularly advantageous in instances where polling or asynchronous processing is throttled or limited. For instance, consider a conventional case where polling is done slowly while a network administrator observes the UI. During the first polling cycle, the interconnect port may be observed as linked. Thereafter, if the polling cycle is every 30 seconds and the port transitions between physical states every second, then it may take 30 seconds before the network administrator is made aware that the link is changing, assuming the polling at 30 seconds even detected the alternate state and not the same state. By contrast, by implementing the techniques described herein, a network administrator may be made directly aware of the unstable state of the interconnect port.

Figure 2:
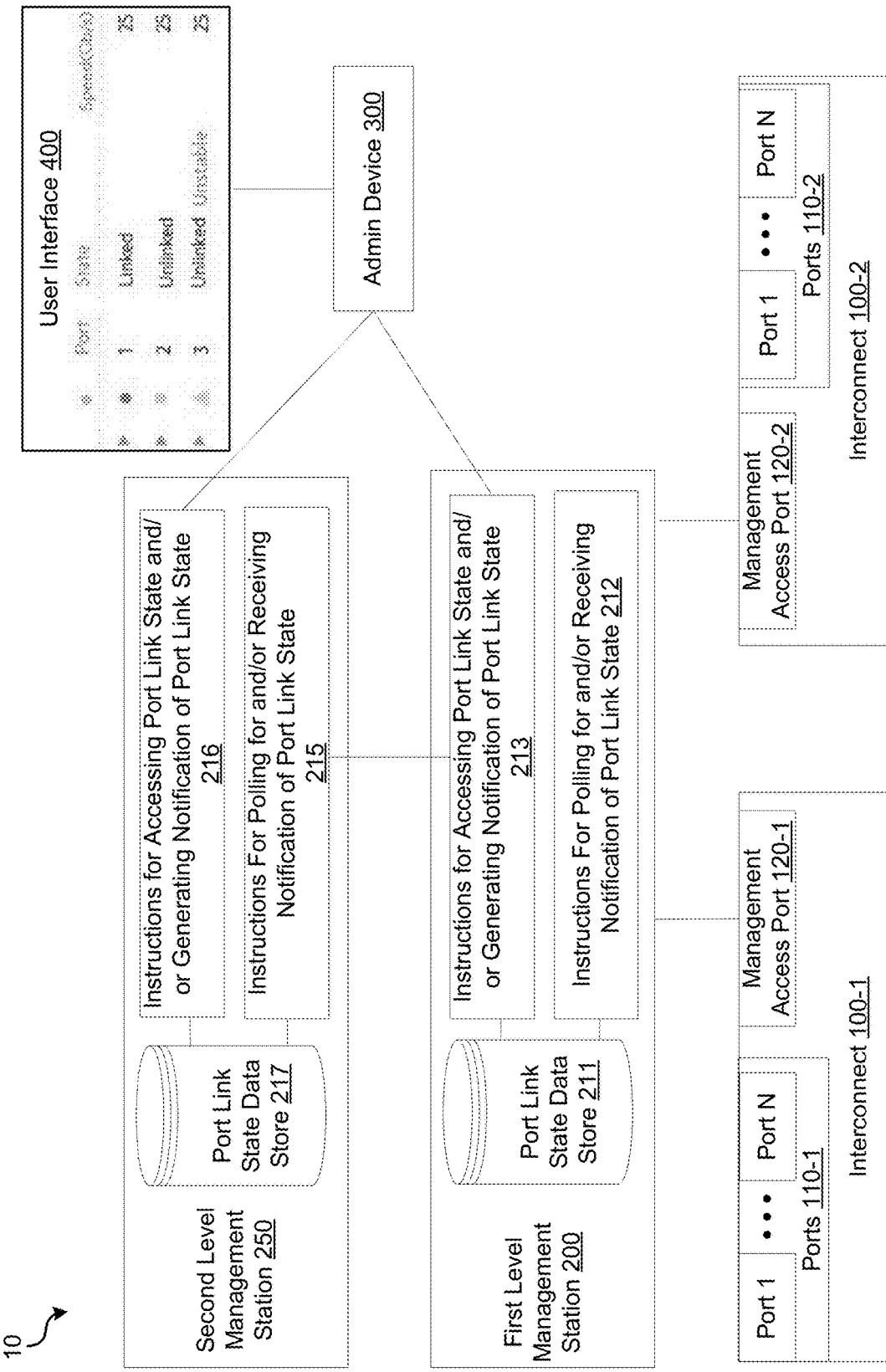
FIG. 2 illustrates an example system in which the disclosure may be implemented.

FIG. 2 illustrates an example system 10 in which the disclosure may be implemented. In system 10, a first level management station 200 and second level management station 250 monitor the physical link states of ports of interconnect 100-1 and interconnect 100-2 (individually referred to as an "interconnect 100" and collectively referred to as "interconnects 200"). For example, interconnects 100 may be network switches or storage switches, each having N ports. Although two interconnects 100 are illustrated in this example, it should be appreciated that the technology described herein may be implemented in environments having a single interconnect or more than two interconnects. Moreover, although two levels of management stations are illustrated in this example, it should be appreciated that the disclosure may apply to environments having one or more first level management stations 200 or environments having more than two levels of management stations. There may be multiple layers of management. If a first layer of management is producing a flapping indication of a modeled port, the next layer of management may process that flapping.

During operation, first level management station 200 is configured to dynamically determine the link state of each of the ports 110-1 and 110-2 of interconnects 100, including whether a port is in an unstable state. To that end, first level management station 200 may include instructions 212 that are executable by a processing device to poll an interconnect 100 for one or more port link states and/or receive a notification from an interconnect 100 of one or more port link states. For example, an interconnect 100 may transmit asynchronous notifications including port link state status (e.g., using Simple Network Management Protocol (SNMP) traps or informs, I2C Switch Management Interface Controller (ISMIC) or Controller Area Network Management Interface Controller (CANMIC) doorbells, etc.), a first level management station 100-1 may retrieve port link state status information through a polling mechanism (e.g., SNMP get, Simple Object Access Protocol (SOAP) get, remote shell command line execution), or some combination thereof. The retrieved port link state data may be stored in a port link state data store 211. For example, port link state data store 211 may be implemented as a table, a database, or some other file structure that provides an identification of physical interconnect ports and each of their last known port link states (e.g., "linked," "unlinked," or "unstable"). The mapping may be provided for a plurality of interconnects.

In the illustrated example, first level management station 200 obtains port link status information of ports 110-1 of interconnect 100-1 via a management access port 120-1 and port link status information of ports 110-2 of interconnect 100-2 via a management access port 120-2. The management access ports may be wired or wireless. In other implementations, the management access ports could be integrated into one of the data ports (e.g., ports 110-1 or 110-2). In implementations where an interconnect and management station are located in a common chassis, a management port may be a set of registers that the interconnect can write and the management station can read. In other implementations, interconnects 100 may use some other mechanism for transmitting port link state status information.

First level management station 200 may also include instructions 213 that are executable by a processing device to access stored port link state data and/or generate a notification including port link state data that may be accessed by a second level management station 250 or an admin device 300. For example, a current link state of a port of an interconnect 100 may be output for display by a user interface 400 (e.g., a GUI or command line interface) that may be presented on a network administrator's device 300. For instance, device 300 may access first level management station 200 through a cloud and view user interface 400 using a cloud-based application. As depicted in FIG. 2 and further described below, the user interface 400 may provide an indication of ports that have an unstable link state.

Second level management station 250 is configured to obtain port link status information of ports 110-1 of interconnect 100-1 and port link status information of ports 110-2 of interconnect 100-2 from first level management station 200, including whether a port is in an unstable state. To that end, second level management station 250 may include instructions 215 that are executable by a processing device to poll (e.g., using the polling protocols described above) first level management station 200 for one or more port link states and/or receive a notification from first level management station 200 (e.g., through the asynchronous transfer protocols described above) of one or more port link states. The retrieved port link state data may be stored in a port link state data store 217, which may have a similar data structure to port link data store 211. Second level management station 250 may also include instructions 216 that are executable by a processing device to access stored port link state data and/or generate a notification including port link state data that may be accessed by another device (e.g., admin device 300).

In some implementations, network admin device 300 may provide automated processing and actions based on the link state reported by a first level management station 200 or second level management station 250. For example, in response to receiving a an indication that a port is in an unstable link state, a network administrator or automated process may cause services to be transferred to other ports (e.g., ports that are not reported as unstable) or take some other action. Knowing if a port is unstable as opposed to being in one of the other two states (e.g., linked or unlinked) may provide for differing actions.

To determine when to label a port as being in an unstable state or leaving an unstable state, interconnect 100 may implement a port link state tracking method, examples of which are further described below. The port link state tracking method may be predefined or modifiable by a user. For example, in one implementation, if a port has a certain number of physical link state changes within a certain period of time, the port may transition into the unstable state. In this implementation, if the port has not changed physical link state for a period of time, the port may transition out of the unstable state into the current linked or unlinked state. Other example algorithms that may be implemented may include delaying notification of state changes until it is determined that a new state is stable as opposed to transient.

Figure 3:
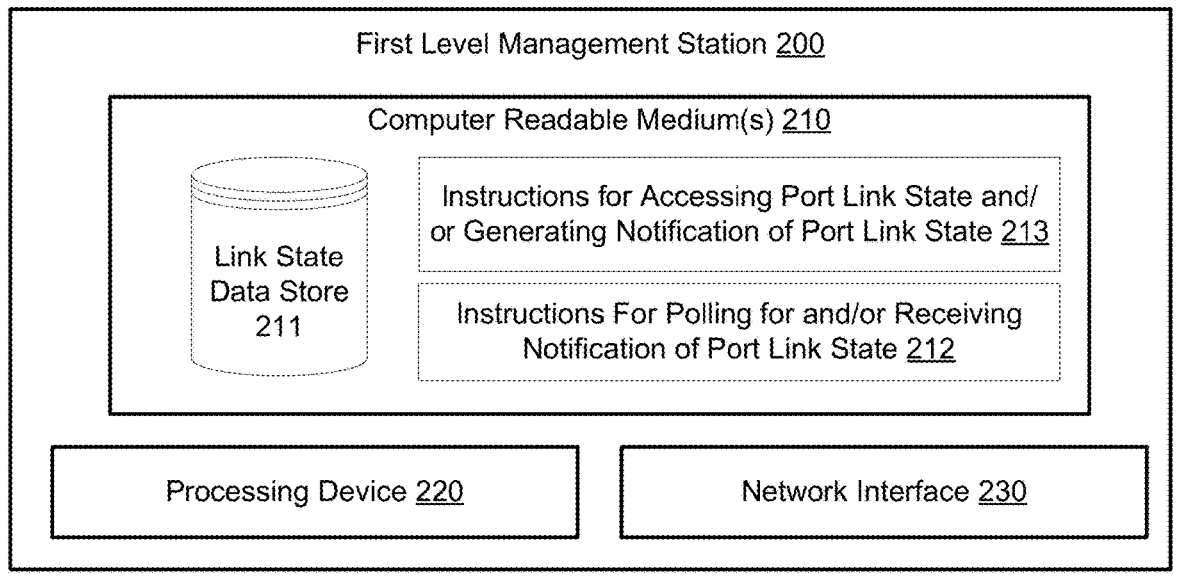
FIG. 3 is a schematic block diagram illustrating an example architecture of a first level management station, in accordance with implementations of the disclosure.

FIG. 3 is a schematic block diagram illustrating an example architecture of a first level management station 200, in accordance with implementations of the disclosure. As illustrated, first level management station 200 may include computer readable medium(s) 210, a processing device 220, and a network interface 230 for communicating with other management stations (e.g., second level management station 250), interconnects 100, and/or admin device 300. Some non-limiting examples of communication methods that may be implemented by networked devices in accordance with the disclosure may include: wired communications methods, such as cable, fiber-optic, or DSL; or wireless communications methods, such as Wi-Fi, cellular communications, or satellite communications, or some combination thereof.

Computer readable medium(s) 210 may store instructions 212-213, that may be executed by processing device 220, to perform the functions described above. Additionally, computer readable medium(s) 210 may store link state data store 211 as described above. In some implementations, computer readable medium(s) 210 may also store instructions (not shown in FIG. 3.) to track link states of ports of an interconnect 100 using physical link state status messages received from the interconnect 100. The link state tracking mechanism may be implemented in a manner similar to the link state tracking mechanism further described below with reference to interconnect 100. Alternatively, all link state tracking may be performed by the interconnect 100.

Figure 4:
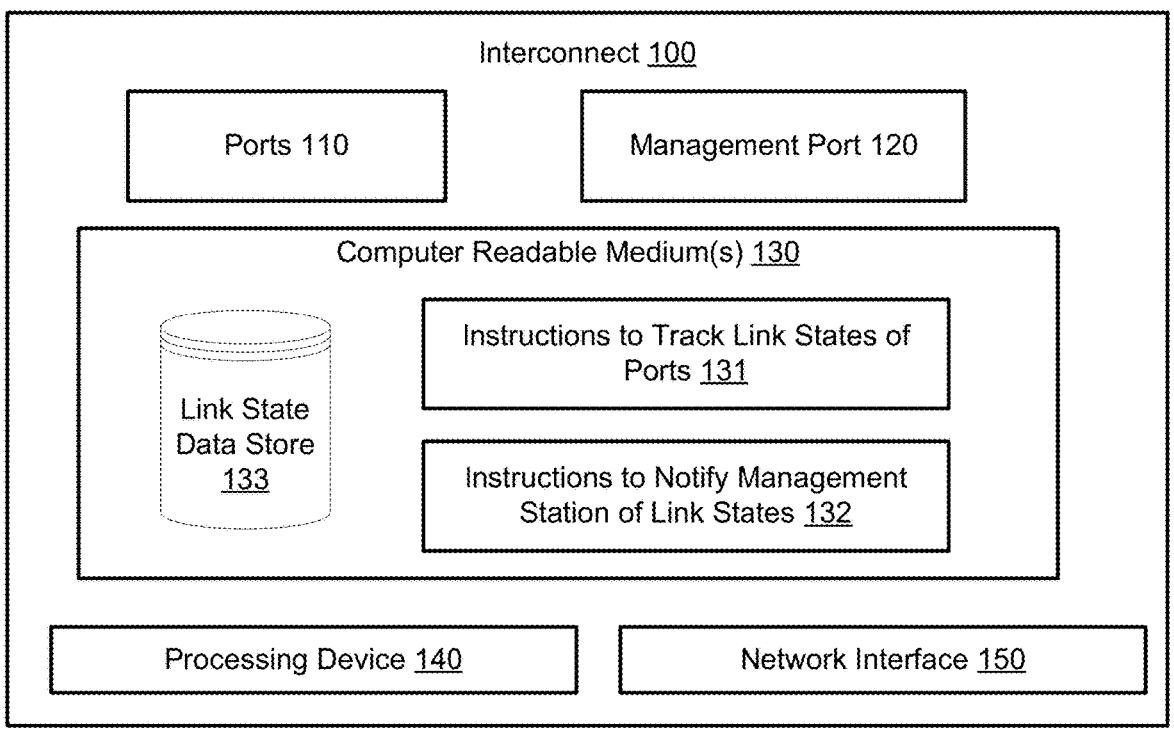
FIG. 4 is a schematic block diagram illustrating an example architecture of an interconnect, in accordance with implementations of the disclosure.

FIG. 4 is a schematic block diagram illustrating an example architecture of an interconnect 100, in accordance with implementations of the disclosure. As illustrated, interconnect 100 may include physical ports 110 for which link states are tracked, a management port 120, computer readable medium(s) 130, a processing device 140, and a network interface 150 for communicating with management stations. In some implementations, management port is a component of network interface 150.

Computer readable medium(s) 110 may store instructions 131 that may be executed by processing device 140 to track a link state status of each port 110, including determining when a port 110 is in an unstable link state. For example, the instructions may be derived from a port link state machine, examples of which are further described below. Additionally, computer readable medium(s) 110 may store link state data store 133 including a present link state status of each port. For example, a table, a database, or some other suitable data structure may be used to associate ports with link states. Further, computer readable medium(s) 110 may store instructions 132 that may be executed by a processing device 140 to notify a management station of the present link states (e.g., based on link state data store 133).

Figure 5:
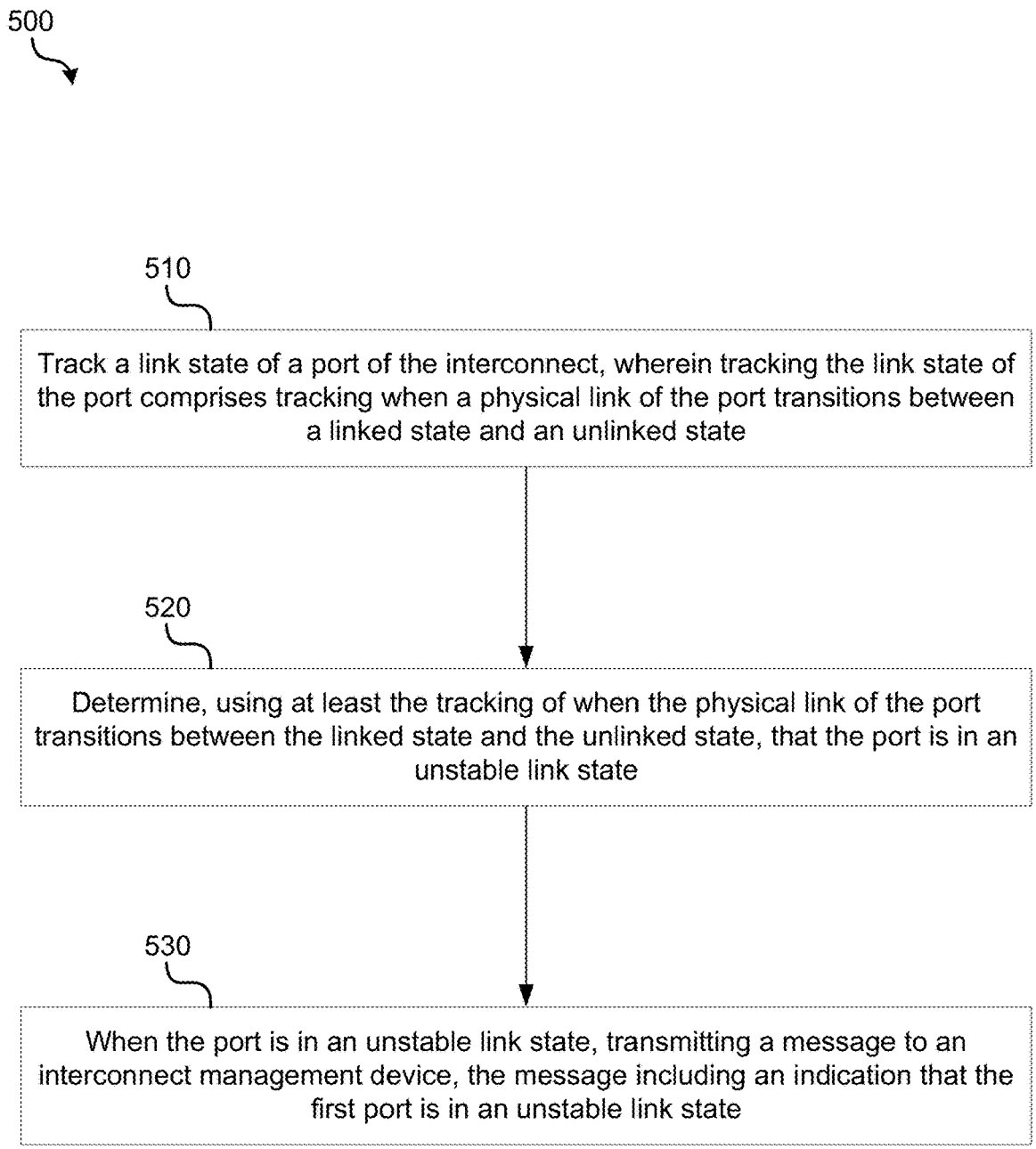
FIG. 5 is an operational flow diagram illustrating an example method that may be implemented by an interconnect, in accordance with implementations of the disclosure.

FIG. 5 is an operational flow diagram illustrating an example method 500 that may be implemented by an interconnect 100, in accordance with implementations of the disclosure. For example, method 500 may be implemented by a processing device 140 executing instructions 131 and/or instructions 132 stored on computer readable medium(s) 130. It should be noted that although method 500 will be described with reference to a single physical port of the interconnect, the operations of method 500 may be implemented for each of the ports of the interconnect 100 (e.g., in parallel). Additionally, it should be noted that port link state updates that are transmitted to management stations may include port link state status data for some or all of the ports.

At operation 510, the interconnect tracks a link state of a port of the interconnect, including tracking when a physical link of the port transitions between a linked state and an unlinked state. The interconnect may track when the physical link transitions from the linked state to the unlinked state or from the unlinked state to the linked state. To this end, one or more values or factors associated with physical link state transitions may be tracked. For example, an amount of a time it takes for the port to transition between the linked state and the unlinked state may be tracked using a timer. The timer may be reset during each transition. As another example, a frequency with which the port transitions between the linked state and the unlinked state over a time period may be tracked.

At operation 520, the interconnect determines, using at least the tracking of when the physical link of the port transitions between the linked state and the unlinked state, that the port is in an unstable link state. One or more factors may be used to determine when the port in an unstable link state. For example, it may be determined that the port is in an unstable link state when the amount of time between physical link transitions falls below a threshold, when the frequency of transitions over a time period exceeds a threshold, or based on a combination of these factors.

In some implementations, in response to determining that the port is in an unstable link state, the interconnect updates a link state attribute or value associated with the port to an attribute or value that indicates that the port link state is unstable. For example, an update may be made to a SNMP management information base (MIB) that recognizes the three states and sends traps when transitioning between the three states. In some implementations, a Representational State Transfer (REST) application programming interface (API) interface could be implemented where a JavaScript Object Notation (JSON) representation of the link state polling has the three states. In some implementations, an Advanced Message Queuing Protocol (AMQP) message may be formatted with the three states.

In other implementations, in response to determining that the port is in an unstable link state, the interconnect updates an additional attribute corresponding to a link state value of the port to indicate that the port link state is an unstable link state. In such implementations, while the additional attribute may be updated, the link state value or attribute of the port may be set to linked or unlinked. For example, if the new attribute indicates instability, the first attribute (e.g., (linked/unlinked) may have no meaning and may be set to either value depending on a design decision.

At operation 530, when the port is in an unstable link state, the interconnect transmits to the interconnect management device a message including an indication that the port is in an unstable link state. In some implementations, the interconnect transmits a message through an asynchronous communication mechanism). In some implementations, the message may be transmitted from a management port of the interconnect to the management station. In other implementations, the interconnect transmitting the message to the management station comprises the interconnect writing the unstable link state indication to a register, memory, or other data store, and the management station retrieving the unstable link state indication by polling the interconnect. For example, if the management port comprises a set of registers, polling may comprise the interconnect management station reading the registers on a set schedule.

Figure 6:
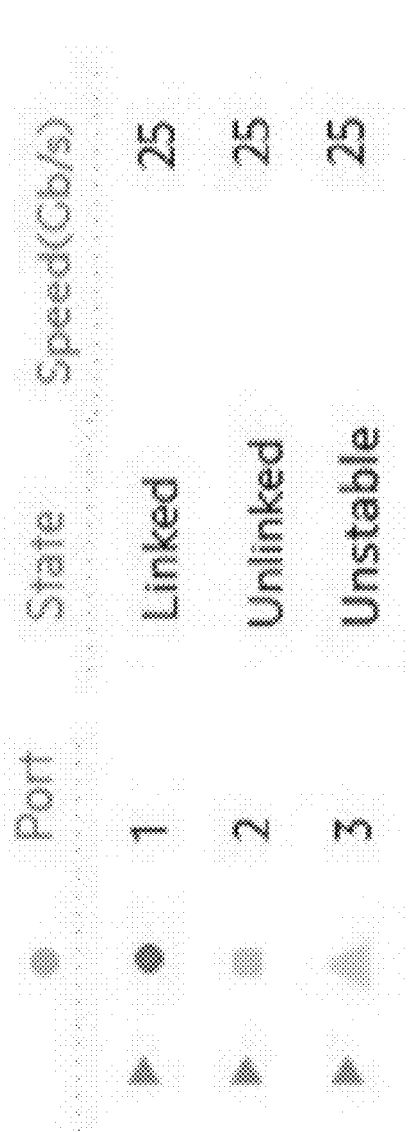
FIG. 6 shows a simplified representation of a port link state status UI, showing an unstable link port state for a port of an interconnect comprising three ports, in accordance with implementations of the disclosure.

In implementations where the interconnect updates the link state value associated with the port to a value that indicates that the port link state is unstable, the transmitted message may comprise the updated link state value. FIG. 6 shows a simplified representation of a port link state status UI, showing an unstable link port state for a port of an interconnect comprising three ports, in accordance with implementations of the disclosure. For example, the UI may be presented by a management station or by another device based on port link state data retrieved from a management station. One advantage of updating a link state attribute definition to include the additional unstable state (e.g., update from two states to three states) is that there is one attribute to look at and decode from either an API point of view (e.g., such as REST) or a GUI point of view.

Figure 7:
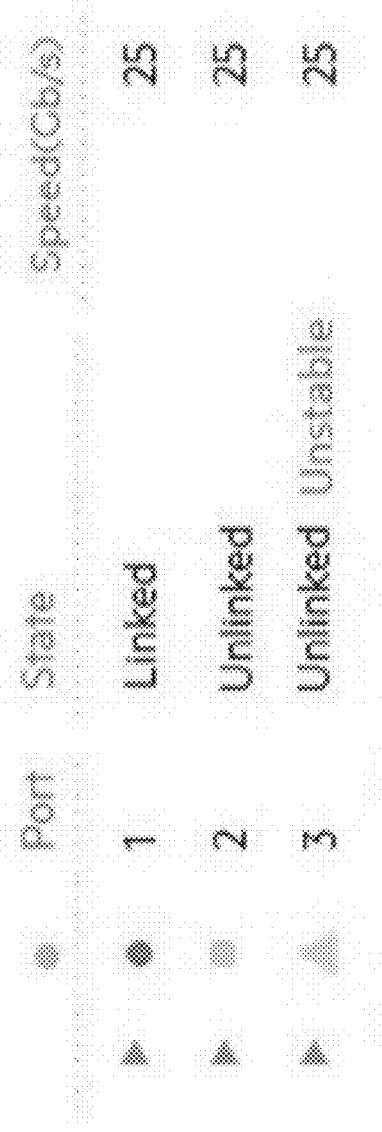
FIG. 7 shows a simplified representation of a port link state status UI, showing an unlinked port state with an unstable attribute identifier for a port of an interconnect comprising three ports, in accordance with implementations of the disclosure.

In implementations where the interconnect updates an attribute corresponding to a link state value of the port to indicate that the port link state is in an unstable link state, the transmitted message may comprise the updated attribute and a link state value indicating that port is linked or unlinked. FIG. 7 shows a simplified representation of a port link state status UI, showing an unlinked port state with an unstable attribute identifier for a port of an interconnect comprising three ports, in accordance with implementations of the disclosure. For example, the UI may be presented by a management station or by another device based on port link state data retrieved from a management station. One advantage of this approach is that it may avoid the need to change link state attribute definitions used by an interconnect or management station (e.g., of linked/unlinked and Boolean value of that). By adding the additional attribute to an interface definition, this may allow for backward compatibility with management stations, supporting the fixed states (e.g., linked/unlinked) for management stations that are not aware of the new attribute, but those that are, may convert the new attribute (e.g., received during operation 530, discussed below) into an unstable state indicator. If the new attribute indicates instability, the first attribute (e.g., (linked/unlinked) may have no meaning and may be set to either value depending on a design decision.

As noted above, after the interconnect updates a state of a port to an unstable link state and/or transmits to the management device an indication that the port is in an unstable link state, to prevent inundation of the management device with link state updates, the interconnect may refrain from transmitting link state update notifications (e.g., asynchronous notifications) while the port remains in an unstable link state (e.g., while the link state value is set to unstable). As such, if after transmitting the message the port remains in the unstable link state after it is determined that the physical link of the port has once again transitioned between the linked state and the unstable linked state, the interconnect may not transmit a second message to the interconnect management device including an indication of a link state of the port. On the other hand, if the port transitions out of the unstable link state (e.g., if a timer started since a prior transition exceeds a threshold), the interconnect may transmit a second message to the interconnect management device including an indication that the port is no longer in the unstable link state. For example, the second message may indicate that the link state value of the port is now set to linked or unlinked.

It should be noted that although method 300 has been described in the context of an interconnect 100 implementing a link state tracking mechanism, in other implementations a management station (e.g., first level management station 200) may implement method 300 based on physical link state transition updates received from an interconnect 100. In such implementations, link state tracking may be implemented only by the management station or by both the management station and the interconnect.

Figure 8:
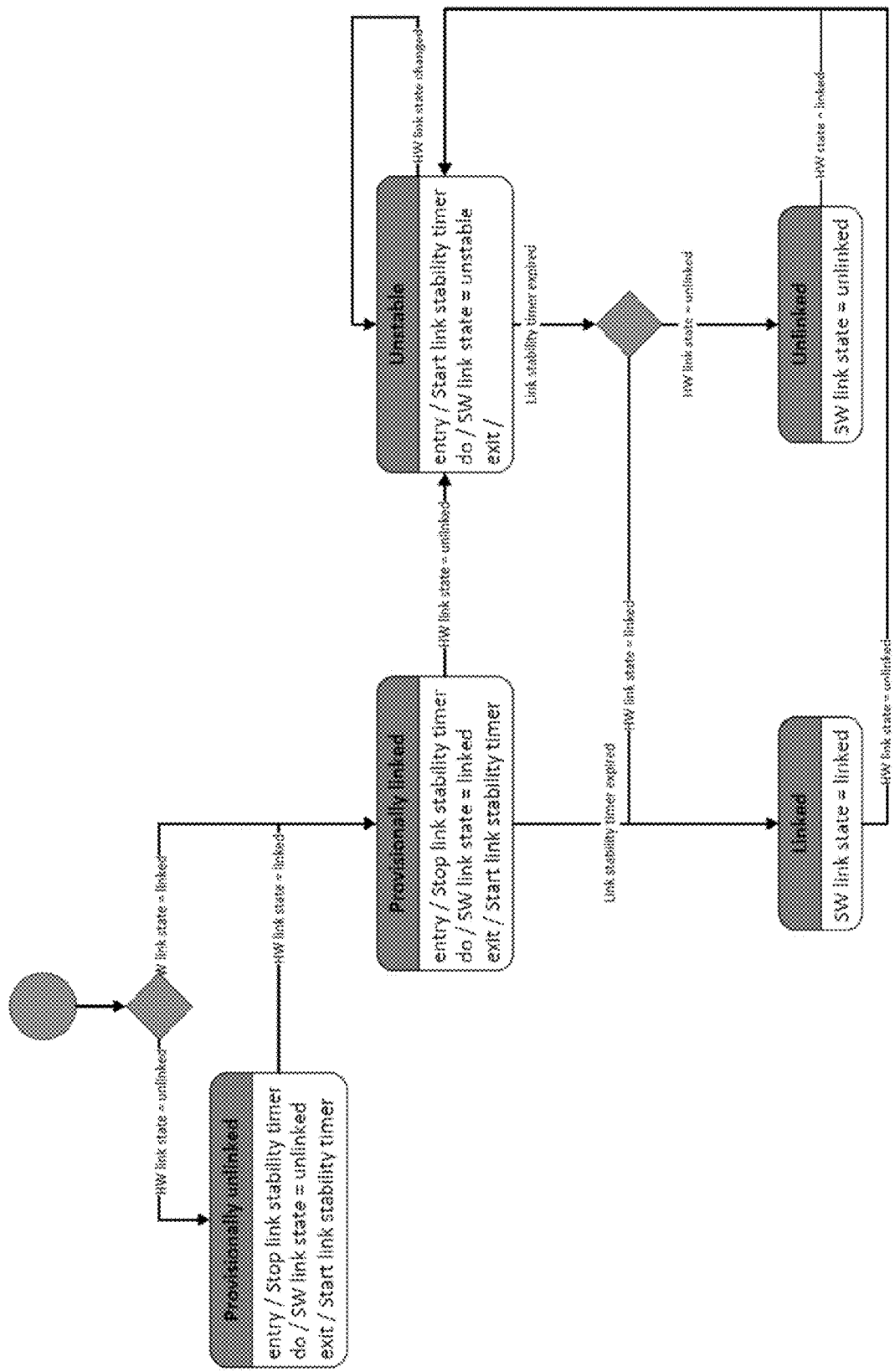
FIG. 8 shows a port link state machine diagram of a state machine that may be utilized by interconnects or management stations to track port link state status, in accordance with implementations of the disclosure.

FIG. 8 shows a port link state machine diagram of a state machine that may be utilized by interconnects or management stations to track port link state status, in accordance with implementations of the disclosure. As illustrated in this example, the state machine may have an initial state (denoted by circle) and five states: provisionally unlinked, provisionally linked, linked, unlinked, and unstable. Actions to perform upon entering a state are illustrated under the state label. Transitions between states or from a state back to itself are denoted by lines with arrowheads. Rules for transitioning between states or back to the same state are denoted by text. Depending on the hardware link state and the current time on a link stability timer, the state machine may transition between various modes, including transitioning into or out of an unstable link state.

In this document, the terms "machine readable medium," "computer readable medium," and similar terms are used to generally refer to non-transitory mediums, volatile or non-volatile, that store data and/or instructions that cause a machine to operate in a specific fashion. Common forms of machine readable media include, for example, a hard disk, solid state drive, magnetic tape, or any other magnetic data storage medium, an optical disc or any other optical data storage medium, any physical medium with patterns of holes, a RAM, a PROM, EPROM, a FLASH-EPROM, NVRAM, any other memory chip or cartridge, and networked versions of the same.

These and other various forms of computer readable media may be involved in carrying one or more sequences of one or more instructions to a processing device for execution. Such instructions embodied on the medium, are generally referred to as "instructions" or "code." Instructions may be grouped in the form of computer programs or other groupings. When executed, such instructions may enable a processing device to perform features or functions of the present application as discussed herein.

In this document, a "processing device" may be implemented as a single processor that performs processing operations or a combination of specialized and/or general-purpose processors that perform processing operations. A processing device may include a CPU, GPU, APU, DSP, FPGA, ASIC, SOC, and/or other processing circuitry.

The various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. Additionally, unless the context dictates otherwise, the methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. An interconnect, comprising:
    a plurality of ports;
    a processor; and
    a non-transitory computer readable medium have instructions stored thereon, that when executed by a processor, cause the interconnect device to:
        track a link state of a first port of the plurality of ports, wherein tracking the link state of the first port comprises tracking when a physical link of the first port transitions between a linked state and an unlinked state;
        determine, using at least the tracking of when the physical link of the first port transitions between the linked state and the unlinked state, that the first port is in an unstable link state; and
        when the first port is in an unstable link state, transmitting a message to an interconnect management device, the message including an indication that the first port is in an unstable link state;
    after transmitting a message to the interconnect management device including an indication that the first port is in an unstable link state, determine that the physical link of the first port has transitioned between the linked state and the unlinked state; and
    if the port remains in the unstable link state after determining that the physical link of the first port has transitioned between the linked state and the unstable linked state, not transmit a second message to the interconnect management device including an indication of a link state of the first port.

2. The interconnect of claim 1, wherein the instructions, when executed by the processor, further cause the interconnect device to: in response to determining that the first port is in an unstable link state, update a link state value associated with the port to a value that indicates that the port link state is unstable, wherein the transmitted message comprises the updated link state value.

3. The interconnect of claim 1, wherein the instructions, when executed by the processor, further cause the interconnect device to: in response to determining that the first port is in an unstable link state, update an attribute corresponding to a link state value of the port to indicate that the port link state is an unstable link state, wherein the transmitted message comprises the updated attribute and a link state value indicating that port is linked or unlinked.

4. The interconnect of claim 1, wherein tracking when the first port transitions between a linked state and an unlinked state comprises tracking an amount of a time it takes for the first port to transition between the linked state and the unlinked state, and wherein determining that the first port is in an unstable link state comprises determining that the amount of time falls below a threshold.

5. The interconnect of claim 1, wherein tracking when the first port transitions between a linked state and an unlinked state comprises tracking a frequency with which the first port transitions between the linked state and the unlinked state over a time period, and wherein determining that the first port is in an unstable link state comprises determining that the frequency exceeds a threshold.

6. The interconnect of claim 1, wherein the instructions, when executed by the processor, further cause the interconnect device to:
if the port is no longer in the unstable link state after determining that the physical link of the first port has transitioned between the linked state and the unstable linked state, transmit a second message to the interconnect management device including an indication that the first port is no longer in the unstable link state.

7. The interconnect of claim 1, wherein the interconnect is a switch, wherein the message is transmitted from a management port of the switch to the management device.

8. The interconnect of claim 1, wherein the interconnect is a physical resource that enables communication between hardware in an enclosure and data center Ethernet local area networks or Fibre Channel storage area networks.

9. The interconnect of claim 1, wherein transmitting the message to the interconnect management device including the indication that the first port is in an unstable link state comprises storing the indication including the unstable link state and the interconnect management device polling the interconnect for the link state.

10. The interconnect of claim 1, wherein transmitting the message including the indication that the first port is in an unstable link state comprises transmitting the message to the management device through an asynchronous communication.

11. A non-transitory computer readable medium have instructions stored thereon, that when executed by a processor, perform operations of:
tracking a link state of a port of interconnect, wherein tracking the link state of the port comprises tracking when a physical link of the port transitions between a linked state and an unlinked state;
determining, using at least the tracking of when the physical link of the port transitions between the linked state and the unlinked state, that the port is in an unstable link state;
when the port is in an unstable link state, transmitting a message to an interconnect management device, the message including an indication that the port is in an unstable link state;
after transmitting a message to the interconnect management device including an indication that the first port is in an unstable link state, determining that the physical link of the first port has transitioned between the linked state and the unlinked state; and
if the port remains in the unstable link state after determining that the physical link of the first port has transitioned between the linked state and the unstable linked state, not transmitting a second message to the interconnect management device including an indication of a link state of the first port.

12. The non-transitory computer readable medium of claim 11, wherein the instructions, when executed by the processor, further perform an operation of: in response to determining that the first port is in an unstable link state:
updating a link state value associated with the port to a value that indicates that the port link state is unstable, wherein the transmitted message comprises the updated link state value; or
updating an attribute corresponding to a link state value of the port to indicate that the port link state is an unstable link state, wherein the transmitted message comprises the updated attribute and a link state value indicating that port is linked or unlinked.

13. The non-transitory computer readable medium of claim 11, wherein tracking when the first port transitions between a linked state and an unlinked state comprises one or more of the following:
tracking an amount of a time it takes for the first port to transition between the linked state and the unlinked state, and wherein determining that the first port is in an unstable link state comprises determining that the amount of time falls below a threshold; and
tracking a frequency with which the first port transitions between the linked state and the unlinked state over a time period, and wherein determining that the first port is in an unstable link state comprises determining that the frequency exceeds a threshold.

14. The non-transitory computer readable medium of claim 11, wherein the instructions, when executed by the processor, further perform an operation of: presenting a graphical user interface showing an indication that the port is in an unstable link state.

15. A system, comprising:
an interconnect comprising a plurality of ports, wherein the interconnect is configured to track a link state status of each of the plurality of ports, including determining when each of the plurality of ports is in an unstable link state;
a management device communicatively coupled to the interconnect, wherein the management device is configured to receive link state status messages from the interconnect, the link state status messages including an indication of whether or not a first port of the plurality of ports is in an unstable link state;
wherein the interconnect is further configured to:
transmit a message to an interconnect management device when the first port is in an unstable link state, the message including an indication of the first port being in an unstable link state;
after transmitting the message to the interconnect management device including an indication that the first port is in an unstable link state, determine that the physical link of the first port has transitioned between the linked state and the unlinked state; and
if the first port remains in the unstable link state after determining that the physical link of the first port has transitioned between the linked state and the unstable linked state, not transmit a second message to the interconnect management device including an indication of a link state of the first port.

16. The system of claim 15, wherein the management device is further configured to present a user interface that provides an indication of whether or not each of the plurality of ports is in an unstable link state.

17. The system of claim 16, wherein the indication comprises an unlinked port state with an unstable attribute identifier.

18. The system of claim 16, wherein the management device is communicatively coupled to a second management device, wherein the management device is further configured to transmit link state status messages to a second management device, the link state status messages including an indication of whether or not one of the plurality of ports is in an unstable link state.

19. The system 15, wherein the management device is configured to provide an application programming interface (API) or perform an action in response to receiving link state status information including the indication of whether or not one of the plurality of ports is in an unstable link state.

* * * * *